United States Patent
Li et al.

(10) Patent No.: US 12,550,921 B2
(45) Date of Patent: Feb. 17, 2026

(54) SUGAR-REDUCED SWEETENER PRODUCT, PREPARATION METHOD THEREFOR, AND APPLICATION THEREOF

(71) Applicant: HUNAN HUACHENG BIOTECH, INC, Hunan (CN)

(72) Inventors: Wei Li, Hunan (CN); Huaxue Huang, Hunan (CN); Jun Huang, Hunan (CN); Jinjun He, Hunan (CN); Guliang Song, Hunan (CN)

(73) Assignee: HUNAN HUACHENG BIOTECH, INC, Hunan (CN)

( * ) Notice: Subject to any disclaimer, the term of this patent is extended or adjusted under 35 U.S.C. 154(b) by 387 days.

(21) Appl. No.: 18/262,190

(22) PCT Filed: Jan. 19, 2021

(86) PCT No.: PCT/CN2021/072648
§ 371 (c)(1),
(2) Date: Jul. 19, 2023

(87) PCT Pub. No.: WO2022/057178
PCT Pub. Date: Mar. 24, 2022

(65) Prior Publication Data
US 2024/0081378 A1 Mar. 14, 2024

(30) Foreign Application Priority Data
Sep. 21, 2020 (CN) .......................... 202010993048.2

(51) Int. Cl.
*A23L 27/30* (2016.01)

(52) U.S. Cl.
CPC .................................. *A23L 27/33* (2016.08)

(58) Field of Classification Search
CPC ...................................................... A23L 27/33
See application file for complete search history.

(56) References Cited

U.S. PATENT DOCUMENTS

| 2007/0116823 A1* | 5/2007 | Prakash | ................. A23L 27/36 426/548 |
| 2021/0274822 A1* | 9/2021 | Zhang | ................ B01D 11/0288 |

FOREIGN PATENT DOCUMENTS

| CN | 106072422 A | 11/2016 |
| CN | 106072424 A | 11/2016 |
| CN | 108740930 A | 11/2018 |

(Continued)

*Primary Examiner* — Jenna A Watts
(74) *Attorney, Agent, or Firm* — NKL Law; Allen Xue

(57) ABSTRACT

A sugar-reduced sweetener can be a high-intensity sweetener, a bulk sweetener, or a one sugar sweetener. The dosages of the high-intensity sweetener and the bulk sweetener satisfy a condition that the sweetness of the two compounded approaches to that of the sugar sweetener. Flavor, sweetness, taste and efficacy of original sugar sweet substances, for example, common sugar varieties in life such as sucrose and brown sugar can be reserved, and the sugar-reduced sweetener can replace sucrose perfectly. During use, according to the requirements of the sugar reduction ratio, the sugar sweetening substances can be added in any proportion, which can greatly reduce the sugar content so as to achieve the purpose of lowering and reducing sugar. In a preparation method of the sugar-reduced sweetener of the present invention, an intermittent spraying method is adopted, so that the quality of a final product is stable.

3 Claims, 1 Drawing Sheet

(56) References Cited

FOREIGN PATENT DOCUMENTS

| | | |
|---|---|---|
| CN | 109247561 A | 1/2019 |
| CN | 110506922 A | 11/2019 |
| CN | 112056539 A | 12/2020 |
| WO | 2018220103 A1 | 12/2018 |

* cited by examiner

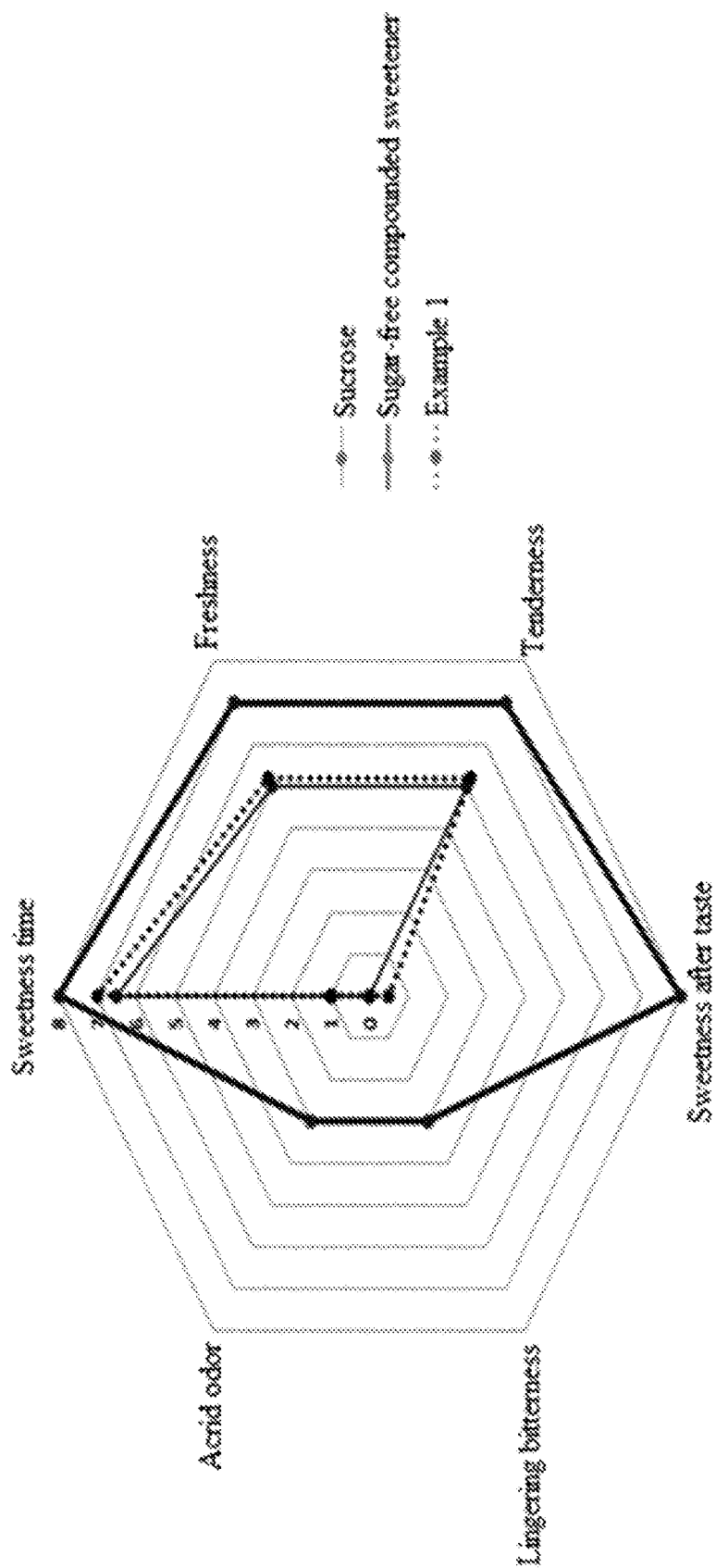

SUGAR-REDUCED SWEETENER PRODUCT, PREPARATION METHOD THEREFOR, AND APPLICATION THEREOF

TECHNICAL FIELD

The present invention relates to sweeteners, in particular to a sugar-reduced sweetener product and a preparation method and application thereof.

BACKGROUND

Sweeteners, as the name suggests, are a kind of substances that can impart sweetness to foods, and are the most widely used food additives in the world. There are many types of sweeteners, which can be divided into natural sweeteners and artificial sweeteners according to their sources; according to their nutritional value, they are divided into nutritive sweeteners and non-nutritive sweeteners; and according to their chemical structures and properties, they are divided into sugar and non-sugar sweeteners.

Since the taste and texture of each sweetener are different from those of sucrose, and when used repeatedly and in large quantities, it often produces bad flavor and aftertaste, thus compound sweeteners came into being.

Compound sweeteners refer to a kind of sweeteners that use two or more natural or chemically synthesized sweeteners in a compounded manner to achieve the purposes of enhancing sweetness and flavor and making up for or covering up bad tastes, and the compound sweeteners can partially or fully replace sucrose to be used in food processing.

Although the compound sweeteners have the advantages of reducing bad taste, increasing flavor, shortening the bad taste at the onset of taste, improving the stability of sweetness, reducing the total amount of sweetener used, and reducing the cost, the compound sweeteners in the prior art still cannot perfectly replace various types of sucrose. For example, white granulated sugar is high in purity, sweet in taste, flat in nature, belongs to the spleen and lung meridians, has the functions of moistening lung and engendering liquid, regulating the middle warmer and tonifying lung, soothing liver qi, relieving a cough, nourishing yin, seasoning, removing ozostomia, treating sores and relieving alcoholism and relieving bittern poisoning, is pure in sweetness and is widely applied to cooking; brown sugar contains a small amount of amino acids, vitamins and minerals, is sweet in taste and warm in nature, enters the spleen, has the functions of tonifying qi and nourishing blood, tonifying spleen and warming stomach, expelling pathogenic wind and dispelling cold, and activating blood circulation to dissipate stasis, and has a special flavor. In addition, thanks to its feature of rapid coloring, it is widely applied to roasting food.

Since 2016, the World Health Organization has been calling on governments to introduce a special tax of at least 20 percent on sugary drinks because high consumption of sugar increases the risk of obesity and type 2 diabetes.

Obesity brings about worldwide problems. Obesity has become a global common disease and a serious problem plaguing the human society. According to statistics, more than 1 billion adults in the world are overweight, and at least 300 million of them are obese. More than 66% of adults in the United States are overweight. More than 60% of adults in Australia are overweight. More than 54% of adults in Russia are overweight. More than 51% of adults in the United Kingdom are overweight. More than 50% of adults in Germany are overweight. More than 30% of adults in China are overweight. Throughout the European continent, more than half of people aged 35 to 65 are overweight. According to the World Health Organization survey, there are about 17.6 million overweight children under the age of 5 in the world. Obesity can easily induce many diseases such as cardiovascular disease, stroke, type 2 diabetes and certain cancers, etc. These diseases are called non-communicable diseases. According to statistics, of the 56.5 million abnormal deaths worldwide in 2001, 33 million cases could be attributed to such diseases. The World Health Organization also predicts that by 2020, non-communicable diseases will account for more than 70% of global diseases.

Experts estimate that the number of people with diabetes worldwide will reach 642 million in the next 25 years after 2015, and the medical expenditure on diabetes will also rise to 802 billion US dollars. According to statistics in 2015, one person dies of diabetes every six seconds in the world, which is higher than the combined death rate of AIDS, tuberculosis and malaria. The International Diabetes Federation estimates that between 5% and 20% of most countries' healthcare budgets are spent on diabetes.

At present, dozens of countries and regions around the world have imposed taxes on sugary drinks, including Denmark, Ireland, France, South Africa, the Philippines, Hungary, Norway, Chile, the United Kingdom, and Berkeley, California and Philadelphia in the United States. Drinks with a total sugar content of more than 5 grams per 100 milliliters meet the tax standard, while pure fruit juice and milk are exempt from tax.

Sugar is the "sweet burden" of people all over the world. On the one hand, sugar is one of the important substances that human beings depend on for survival, and on the other hand, sugar is more harmful than tobacco and alcohol, reaching a shocking situation.

Therefore, the present invention provides a sugar-reduced sweetener product, which can retain the flavor, sweetness, taste and efficacy of the original sucrose varieties, and can greatly reduce the sugar content. The sugar-reduced sweetener product is of great practical significance.

SUMMARY

The technical problem to be solved by the present invention is to provide a sugar-reduced sweetener product and a preparation method and application thereof.

The sugar-reduced sweetener product provided by the present invention includes at least one high-intensity sweetener, at least one bulk sweetener and at least one sugar sweetener, where the dosages of the high-intensity sweetener and the bulk sweetener satisfy a condition that the sweetness of the two compounded approaches to that of the sugar sweetener.

Preferably, the weight ratio of the high-intensity sweetener to the bulk sweetener is 1:(100-2000); and more preferably, the weight ratio of the high-intensity sweetener to the bulk sweetener is 1:(400-800).

Preferably, the sugar sweetener accounts for 10-50% by weight in the sugar-reduced sweetener. The sweetness approaching to the sugar sweeteners means that the sweetness after compounding the high-intensity sweeteners and the bulk sweeteners does not exceed 30%, preferably 20%, more preferably 10% compared with that of the sugar sweeteners.

In the present invention, the term "sweetness" is also called specific sweetness, which is a relative value and is usually based on sucrose. The sweetness of a 10 wt % or 15 wt % sucrose aqueous solution at 20° C. is 1.0, and the sweetness of other sugars is acquired at the same concentration by comparing with it.

High-intensity sweeteners generally refer to sweeteners with the sweetness of 100 times or more, including natural and/or synthetic high-intensity sweeteners. The natural high-intensity sweeteners comprise at least one of mogroside V, 11-O-mogroside V, mogroside VI, siamenside I, mogroside IV, mogroside III, stevioside, rebaudioside A, rebaudioside B, rebaudioside C, rebaudioside D, rebaudioside E, rebaudioside F, dulcoside A, rubusoside, steviolbioside, glycyrrhizin, thaumatin, monellin, mabinlin, curculin, pentadin and brazzein; the synthetic high-intensity sweetener includes at least one of sucralose, aspartame, alitame, sodium saccharin, neotame, acesulfame potassium, cyclamate and neohesperidin dihydrochalcone.

In a preferred implementation mode, the high-intensity sweetener includes mogroside V, and mogroside V accounts for 50-90 wt %, and preferably mogroside V accounts for 70-90 wt %.

In a more preferred implementation mode of the present invention, the high-intensity sweetener is a compound of mogroside V and other 11-O-mogroside V, mogroside VI and siamenside I.

Further, the high-intensity sweetener is a compound of mogroside V, 11-O-mogroside V, mogroside VI and siamenside I at the mass ratio of (50-60):(5-10):(3-7):(0.4-1).

The bulk sweetener comprises functional monosaccharides, functional oligosaccharides and polysaccharide alcohols; the functional monosaccharides comprise at least one of ribose, arabinose, xylose, deoxyribose, psicose, fructose, sorbose, tagatose, glucose, mannose, galactose, talose, fucose, rhamnose sugar, sedoheptulose and mannoheptulose; the functional oligosaccharides comprise at least one of stachyose, raffinose, isomaltulose, lactulose, fructooligosaccharides, xylooligosaccharides, galactooligosaccharide, isomaltooligosaccharide, soybean oligosaccharide, chitosan oligosaccharide, mannose oligosaccharide, trehalose, nigerooligosaccharides, inulin, gentian oligosaccharide and phosphate oligosaccharide; and the polysaccharide alcohols comprise at least one of erythritol, xylitol, maltitol, isomaltitol, sorbitol, mannitol, lactitol and hydrogenated starch hydrolyzates.

The sugar sweetener is the sugar substance with the sweetness approaching to sucrose, specifically including at least one of white granulated sugar, yellow granulated sugar, brown granulated sugar, soft white sugar, single crystal rock sugar, polycrystalline rock sugar, brown sugar, brown sugar, borneol sugar and cube sugar.

The present invention also provides a preparation method of the sugar-reduced sweetener product, including the following steps:
(1) Preparing of an adhesive: after dissolving a high-intensity sweetener and a sugar sweetener in hot water, filtering the mixture with a ceramic membrane and preserving heat to obtain the adhesive;
(2) Preheating: putting the bulk sweetener (solid) into a fluidized bed of a boiling granulator, starting a fan, and performing heating;
(3) Spraying of the adhesive: spraying the adhesive in step (1) intermittently, keeping the materials in a fluidization chamber boiling and mixing the materials evenly; and
(4) Drying and cooling: after spraying the adhesive, subjecting the mixture to heat preservation and drying, and leaving the mixture stand for cooling to obtain a sugar-reduced sweetener product.

Further, in step (1), the amount of hot water used is 0.5-6 times, preferably 2-3 times, of the total mass of the high-intensity sweetener and the sugar sweetener; the temperature of the hot water is 50-80° C. If the amount of hot water is too much, the concentration of the adhesive will be too low, the volume will be too large, and the viscosity will be too small, which will increase the difficulty and processing capacity of boiling granulation; if the amount of hot water is too small, the concentration of the adhesive will be too high, the volume will be too small, and the viscosity will be too large, resulting in poor solubility of the adhesive, blockage of the atomizer, short atomizing and mixing time, and difficulty in uniform adhesion of the materials and other negative effects.

Further, in step (1), the pore diameter of the ceramic membrane is 0.5-10 Further, in step (1), the temperature of the heat preservation is 90-105° C., and the time is 1~4 h.

Further, in step (2), the heating temperature is 60-120° C.

Further, in step (3), the intermittent injection is injection by 3 to 5 times. The amount of spraying each time decreases, and the amount of each decrease does not exceed 25 wt % of the amount of the last spraying; the mixing time increases after each spraying, and the mixing time for the first time is not less than 30-60 minutes, and the increasing time for each subsequent mixing is 10-30 minutes.

The inventors have found that the adhesive in step (1) is sprayed in stages and in an intermittent manner by a specific program, that is, the amount of injection is gradually reduced, and the mixing time after spraying gradually increases, which can fully induce adhesion of the adhesive, so that the adhesive is in full contact with the solid material in the fluidized bed, and thus, the components of the sweetener are evenly mixed; secondly, the adhesive on the surface of the solid material is dried in time to prevent excessive adhesion from causing uneven particle size and sweetness. It is guaranteed that the obtained compound sweetener features stable quality, consistent granule size and good flowability, the components are closely and uniformly adhered, the water content is low, the dissolution rate in water is fast, and the stability after dissolution is excellent, and the sugar-reduced sweetener will not separate out or change color after being placed for a long time.

In the present invention, heat preservation and drying, and standing and cooling can be realized by a boiling granulator.

The present invention has the following beneficial effects:
1. Flavor, sweetness, taste and efficacy of original sugar sweet substances, for example, common sugar varieties in life such as sucrose and brown sugar can be reserved, and the sugar-reduced sweetener can replace sucrose perfectly.
2. Since after the high-intensity sweetener and the bulk sweetener are compounded, the sweetness approaches to that of the sugar sweeteners, during use, sugar sweeteners can be added in any proportion according to the sugar reduction ratio. That is, the content of sugar can be arbitrarily reduced to achieve the purpose of lowering and reducing sugar.
3. The intermittent spraying method is adopted, and the amount of injection and the mixing time after injection during intermittent spraying are optimized, so that the quality of the final product is stable, the components are closely and uniformly adhered, the water content is low, the dissolution rate in water is fast, and the stability after dissolution is excellent, and the sugar-reduced sweetener will not separate out or change color after being placed for a long time.

4. The present invention features stable production process, simple equipment, environmental protection and safety, and is free of pollution and suitable for scaled production.

The sugar-reduced sweetener provided by the present invention can be applied to dairy products, food, medicine, condiments, health products, cosmetics, flavors and fragrances.

BRIEF DESCRIPTION OF DRAWINGS

The FIGURE is an evaluating and testing data diagram of a sugar-reduced sweetener obtained in Example 1 by an electronic tongue.

DETAILED DESCRIPTION

The present invention will be described in detail below through specific embodiments. In the following embodiments, the mogroside compounded sweeteners include mogroside V, 11-O-mogroside V, mogroside VI and siamenside I, purchased from Hunan Huacheng Biological Resources Co., Ltd. The ceramic membrane has been purchased from Nanjing Fulinde Environmental Protection Technology Co., Ltd. The fluidized granulator has been purchased from Changzhou Bubu Drying Equipment Co., Ltd. Unless otherwise specified, other materials are common commercially available products.

Example 1

A preparation method of a sugar-reduced sweetener product includes the following steps:
(1) Preparing of an adhesive: 1 part of a mogroside compounded sweetener (the mass ratio of mogroside V to 11-O-mogroside V to mogroside IV to siamenoside I was 50:10:4:06 (200 times sweetness) and 570 parts of white granulated sugar (1 time sweetness) were dissolved in 60° C. hot water which was equivalently three times of total mass of the two, the mixture was filtered with a ceramic membrane with the pore diameter of 1 μm, and heat of a filtrate was preserved at 90° C. for 2 h to obtain the adhesive;
(2) Preheating: 569 parts of erythritol (0.65 times sweetness) were put into a fluidized bed of a boiling granulator, a fan was started, and the mixture was heated to 100° C.;
(3) Spraying of the adhesive: the adhesive obtained in step (1) was intermittently sprayed, where 33% of the total amount of the adhesive was sprayed for the first time, and mixing was performed for 30 min; 27% of the total amount of the adhesive was sprayed for the second time, and mixing was performed for 60 min; 22% of the total amount of the adhesive was sprayed for the third time, and mixing was performed for 80 min; and 18% of the total amount of the adhesive was sprayed for the fourth time, and mixing was performed for 100 min; the materials in a fluidization chamber was kept boiling and were uniformly mixed; and
(4) Drying and cooling: after the adhesive was sprayed, the mixture was subjected to heat preservation and drying, the granulator was stopped, and the mixture was left stand and cooled to obtain a white granulated sugar flavored sugar-reduced sweetener product.

The white granulated sugar flavored sugar-reduced sweetener product obtained in the example is consistent with white granulated sugar in terms of appearance, color, taste, sweetness and so forth, and the sugar-reducing proportion is about 50%.

Example 2

A preparation method of a sugar-reduced sweetener product includes the following steps:
(1) Preparing of an adhesive: 1 part of a mogroside compounded sweetener (the mass ratio of mogroside V to 11-O-mogroside V to mogroside IV to siamenoside I was 50:10:4:0.6 (200 times sweetness) and 380 parts of white granulated sugar (1 time sweetness) were dissolved in 60° C. hot water which was equivalently three times of total mass of the two, the mixture was filtered with a ceramic membrane with the pore diameter of 1 μm, and heat of a filtrate was preserved at 90° C. for 2 h to obtain the adhesive;
(2) Preheating: 569 parts of erythritol (0.65 times sweetness) was put into a fluidized bed of a boiling granulator, a fan was started, and the mixture was heated to 100° C.;
(3) Spraying of the adhesive: the adhesive obtained in step (1) was intermittently sprayed, wherein 33% of the total amount of the adhesive was sprayed for the first time, and mixing was performed for 30 min; 27% of the total amount of the adhesive was sprayed for the second time, and mixing was performed for 60 min; 22% of the total amount of the adhesive was sprayed for the third time, and mixing was performed for 80 min; and 18% of the total amount of the adhesive was sprayed for the fourth time, and mixing was performed for 100 min; the materials in a fluidization chamber was kept boiling and were uniformly mixed; and
(4) Drying and cooling: after the adhesive was sprayed, the mixture was subjected to heat preservation and drying, the granulator was stopped, and the mixture was left stand and cooled to obtain a white granulated sugar flavored sugar-reduced sweetener product.

The white granulated sugar flavored sugar-reduced sweetener product obtained in the example is consistent with white granulated sugar in terms of appearance, color, taste, sweetness and so forth, and the sugar-reducing proportion is about 60%.

Example 3

A preparation method of a sugar-reduced sweetener product includes the following steps:
(1) Preparing of an adhesive: 1 part of a mogroside compounded sweetener (the mass ratio of mogroside V, 11-O-mogroside V, mogroside IV and siamenoside I was 50:10:4:0.6 (200 times sweetness) and 244.3 parts of white granulated sugar (1 time sweetness) were dissolved in 60° C. hot water which was equivalently two times of total mass of the two, the mixture was filtered with a ceramic membrane with the pore diameter of 1 μm, and heat of a filtrate was preserved at 90° C. for 2 h to obtain the adhesive;
(2) Preheating: 569 parts of erythritol (0.65 times sweetness) was put into a fluidized bed of a boiling granulator, a fan was started, and the mixture was heated to 100° C.;
(3) Spraying of the adhesive: the adhesive obtained in step (1) was intermittently sprayed, where 33% of the total amount of the adhesive was sprayed for the first time, and mixing was performed for 30 min; 27% of the total amount of the adhesive was sprayed for the second time, and mixing was performed for 60 min; 22% of the total amount of the adhesive was sprayed for the third time, and mixing was performed for 80 min; and 18% of the total amount of the adhesive was sprayed for the fourth time, and mixing was performed for 100 min; the materials in a fluidization chamber was kept boiling and were uniformly mixed; and (4) Drying and cooling: after the adhesive was sprayed, the mixture was subjected to heat preservation and drying, the granulator was stopped, and the mixture was left stand and cooled to obtain a white granulated sugar flavored sugar-reduced sweetener product.

The white granulated sugar flavored sugar-reduced sweetener product obtained in the example is consistent with white granulated sugar in terms of appearance, color, taste, sweetness and so forth, and the sugar-reducing proportion is about 70%.

Example 4

A preparation method of a sugar-reduced sweetener product includes the following steps:
(1) Preparing of an adhesive: 1 part of a mogroside compounded sweetener (the mass ratio of mogroside V to 11-O-mogroside V to mogroside IV to siamenoside I was 50:10:4:0.6 (200 times sweetness) and 142.5 parts of white granulated sugar (1 time sweetness) were dissolved in 60° C. hot water which was equivalently two times of total mass of the two, the mixture was filtered with a ceramic membrane with the pore diameter of 1 μm, and heat of a filtrate was preserved at 90° C. for 2 h to obtain the adhesive;
(2) Preheating: 569 parts of erythritol (0.65 times sweetness) was put into a fluidized bed of a boiling granulator, a fan was started, and the mixture was heated to 100° C.;
(3) Spraying of the adhesive: the adhesive obtained in step (1) was intermittently sprayed, where 33% of the total amount of the adhesive was sprayed for the first time, and mixing was performed for 30 min; 27% of the total amount of the adhesive was sprayed for the second time, and mixing was performed for 60 min; 22% of the total amount of the adhesive was sprayed for the third time, and mixing was performed for 80 min; and 18% of the total amount of the adhesive was sprayed for the fourth time, and mixing was performed for 100 min; the materials in a fluidization chamber was kept boiling and were uniformly mixed; and
(4) Drying and cooling: after the adhesive was sprayed, the mixture was subjected to heat preservation and drying, the granulator was stopped, and the mixture was left stand and cooled to obtain a white granulated sugar flavored sugar-reduced sweetener product.

The white granulated sugar flavored sugar-reduced sweetener product obtained in the example is consistent with white granulated sugar in terms of appearance, color, taste, sweetness and so forth, and the sugar-reducing proportion is about 80%.

Example 5

A preparation method of a sugar-reduced sweetener product includes the following steps:
(1) Preparing of an adhesive: 1 part of a mogroside compounded sweetener (the mass ratio of mogroside V, 11-O-mogroside V, mogroside IV and siamenoside I was 50:10:4:0.6 (200 times sweetness) and 63.3 parts of white granulated sugar (1 time sweetness) were dissolved in 60° C. hot water which was equivalently three times of total mass of the two, the mixture was filtered with a ceramic membrane with the pore diameter of 1 μm, and heat of a filtrate was preserved at 90° C. for 2 h to obtain the adhesive;
(2) Preheating: 569 parts of erythritol (0.65 times sweetness) was put into a fluidized bed of a boiling granulator, a fan was started, and the mixture was heated to 100° C.;
(3) Spraying of the adhesive: the adhesive obtained in step (1) was intermittently sprayed, wherein 33% of the total amount of the adhesive was sprayed for the first time, and mixing was performed for 30 min; 27% of the total amount of the adhesive was sprayed for the second time, and mixing was performed for 60 min; 22% of the total amount of the adhesive was sprayed for the third time, and mixing was performed for 80 min; and 18% of the total amount of the adhesive was sprayed for the fourth time, and mixing was performed for 100 min; the materials in a fluidization chamber was kept boiling and were uniformly mixed; and
(4) Drying and cooling: after the adhesive was sprayed, the mixture was subjected to heat preservation and drying, the granulator was stopped, and the mixture was left stand and cooled to obtain a white granulated sugar flavored sugar-reduced sweetener product.

The white granulated sugar flavored sugar-reduced sweetener product obtained in the example is consistent with white granulated sugar in terms of appearance, color, taste, sweetness and so forth, and the sugar-reducing proportion is about 90%.

Example 6

A preparation method of a sugar-reduced sweetener product includes the following steps:
(1) Preparing of an adhesive: 1 part of a mogroside compounded sweetener (the mass ratio of mogroside V to 11-O-mogroside V to mogroside IV to siamenoside I was 50:10:4:0.6 (200 times sweetness) and 570 parts of brown sugar (1 time sweetness) were dissolved in 70° C. hot water which was equivalently two times of total mass of the two, the mixture was filtered with a ceramic membrane with the pore diameter of 1 μm, and heat of a filtrate was preserved at 90° C. for 2 h to obtain the adhesive;
(2) Preheating: 569 parts of erythritol (0.65 times sweetness) was put into a fluidized bed of a boiling granulator, a fan was started, and the mixture was heated to 100° C.;
(3) Spraying of the adhesive: the adhesive obtained in step (1) was intermittently sprayed, wherein 33% of the total amount of the adhesive was sprayed for the first time, and mixing was performed for 30 min; 27% of the total amount of the adhesive was sprayed for the second time, and mixing was performed for 60 min; 22% of the total amount of the adhesive was sprayed for the third time, and mixing was performed for 80 min; and 18% of the total amount of the adhesive was sprayed for the fourth time, and mixing was performed for 100 min; the materials in a fluidization chamber was kept boiling and were uniformly mixed; and
(4) Drying and cooling: after the adhesive was sprayed, the mixture was subjected to heat preservation and drying, the granulator was stopped, and the mixture was left stand and cooled to obtain a brown sugar flavored sugar-reduced sweetener product.

The brown sugar flavored sugar-reduced sweetener product obtained in the example is consistent with brown sugar in terms of appearance, color, taste, sweetness and so forth, and the sugar-reducing proportion is about 50%.

Example 7

A preparation method of a sugar-reduced sweetener product includes the following steps:
(1) Preparing of an adhesive: 1 part of a mogroside compounded sweetener (the mass ratio of mogroside V, 11-O-mogroside V, mogroside IV and siamenoside I was 50:10:4:0.6 (200 times sweetness) and 63.3 parts of brown sugar (1 time sweetness) were dissolved in 70° C. hot water which was equivalently two times of total mass of the two, the mixture was filtered with a ceramic membrane with the pore diameter of 1 μm, and heat of a filtrate was preserved at 90° C. for 2 h to obtain the adhesive;
(2) Preheating: 569 parts of erythritol (0.65 times sweetness) was put into a fluidized bed of a boiling granulator, a fan was started, and the mixture was heated to 100° C.;
(3) Spraying of the adhesive: the adhesive obtained in step (1) was intermittently sprayed, wherein 33% of the total amount of the adhesive was sprayed for the first time, and mixing was performed for 30 min; 27% of the total amount of the adhesive was sprayed for the second time, and mixing was performed for 60 min; 22% of the total amount of the adhesive was sprayed for the third time, and mixing was performed for 80 min; and 18% of the total amount of the adhesive was sprayed for the fourth time, and mixing was performed for 100 min; the materials in a fluidization chamber was kept boiling and were uniformly mixed; and
(4) Drying and cooling: after the adhesive was sprayed, the mixture was subjected to heat preservation and drying, the granulator was stopped, and the mixture was left stand and cooled to obtain a brown sugar flavored sugar-reduced sweetener product.

The brown sugar flavored sugar-reduced sweetener product obtained in the example is consistent with brown sugar in terms of appearance, color, taste, sweetness and so forth, and the sugar-reducing proportion is about 90%.

Example 8

Other conditions and steps are the same as those in the example 1. The difference lies in that in 1 part of the mogroside compounded sweetener, the mass ratio of mogroside V to 11-O-mogroside V to siamenoside I was 50:10:0.6, i.e., no mogroside VI is added.

Example 9

Other conditions and steps are the same as those in the example 1. The difference lies in that in 1 part of the mogroside compounded sweetener, the mass ratio of mogroside V to mogroside IV to siamenoside I was 50:4:0.6, i.e., no 11-O-mogroside V is added.

Example 10

Other conditions and steps are the same as those in the example 1. The difference lies in that in 1 part of the mogroside compounded sweetener, the mass ratio of mogroside V, 11-O-mogroside V, mogroside IV and siamenoside I was 40:10:4:0.6.

Example 11

Other conditions and steps are the same as those in the example 1. The difference lies in that the step of spraying of the adhesive in step (3) is as follows: the adhesive obtained in step (1) was intermittently sprayed in three times, where 40% of the total amount of the adhesive was sprayed for the first time, and mixing was performed for 30 min; 33% of the total amount of the adhesive was sprayed for the second time, and mixing was performed for 60 min; and 27% of the total amount of the adhesive was sprayed for the third time, and mixing was performed for 80 min.

Example 12

Other conditions and steps are the same as those in the example 1. The difference lies in that the step of spraying of the adhesive in step (3) is as follows: the adhesive obtained in step (1) was intermittently sprayed in fourth times, where 25% of the total amount of the adhesive was sprayed each time, and the mixing time each time was 40 min.

Example 13

Other conditions and steps are the same as those in the example 1. The difference lies in that 1 part of the mogroside compounded sweetener is compounded by mogroside V, rebaudioside A and stevioside at the mass ratio of 50:10:5 (200 times sweetness).

The white granulated sugar flavored sugar-reduced sweetener product obtained in the example is substantially consistent with white granulated sugar in terms of appearance, color, taste, sweetness and so forth, and the sugar-reducing proportion is about 50%.

Example 14

Other conditions and steps are the same as those in the example 1. The difference lies in that 1 part of the mogroside compounded sweetener is compounded by mogroside V, rebaudioside D and sucralose at the mass ratio of 50:10:0.7 (200 times sweetness).

The white granulated sugar flavored sugar-reduced sweetener product obtained in the example is substantially consistent with white granulated sugar in terms of appearance, color, taste, sweetness and so forth, and the sugar-reducing proportion is about 50%.

Example 15

Other conditions and steps are the same as those in the example 1. The difference lies in that spraying of the adhesive in step (3) is as follows: the adhesive obtained in step (1) was intermittently sprayed in three times, where the total amount of the adhesive sprayed for the first time was 50%, and mixing was performed for 10 min; the total amount of the adhesive sprayed for the second time was 25%, and mixing was performed for 8 min; and the total amount of the adhesive sprayed for the third time was 25%, and mixing was performed for 15 min.

Example 16

Except the step (3), other steps of a preparation method of a sugar-reduced sweetener product are the same as those in the example 1.

Step (3): spraying of the adhesive: the adhesive obtained in the step (1) was sprayed at one time, the mixture was mixed for 3 h after the adhesive was sprayed, the materials in the fluidization chamber was kept boiling, and the materials were uniformly mixed.

The sugar-reducing proportion of the white granulated sugar flavored sugar-reduced sweetener product is about 50%.

Application Example 1

Application of the brown sugar flavored sugar-reduced sweetener in bread:
1. 40 g of the brown sugar flavored sugar-reduced sweetener in the example 6 was taken and was fully dissolved with 40 g of boiled water to obtain sugar water;
2. 150 g of high protein flour, 50 g of eggs (egg pulp), 3 g of yeast powder and 2 g of salt were mixed with the sugar water, the mixture was manually or mechanically kneaded for 10 min, 30 g of butter was added, and the mixture was kneaded continuously for 10-15 min till a membrane was shown;
3. The kneaded dough was put in a pot, was covered with a fresh-keeping film and was fermented at about 30° C. for 2 h till the dough expanded to about 2-2.5 times of original volume;
4. The fermented dough was taken out, flattened with a palm to exhaust air thoroughly, and then the dough was divided into eight parts and the eight parts were rounded respectively;
5. A bread roasting mold was oiled to prevent adhesion, then small doughs were put in the mold and were flattened, and were fermented at 38° C. continuously for 40 min till the volumes of the doughs expanded two times; and
6. A layer of egg pulp was brushed to the surfaces of the doughs, the bread roasting mold, together with the doughs, was put in a preheated oven with upper and lower fires at 170° C., and the doughs were roasted for about 15 min in the middle layer till the surfaces were golden, and the doughs were taken out of the oven to obtain sugar-reducing bread products.

The sugar-reducing bread products obtained in the example are not different from common brown sugar bread products in terms of appearance, color and luster, fragrance, taste and so forth.

Application Example 2

Application of the white granulated sugar flavored sugar-reduced sweetener in ice cream:
1. Two yolks were taken, 60 g of the white granulated sugar flavored sugar-reduced sweetener product in the example 3 was added, a few drops of lemon juice was dropped in, and the mixture was uniformly stirred till the yolks and the white granulated sugar flavored sugar-reduced sweetener product were completely fused for later use;
2. 50 of milk was poured into a milk pan, and was heated with a small fire till the milk bubbled;
3. The milk was poured into an egg yolk emulsion in times, and the mixture was uniformly stirred while the milk was poured;
4. The milk egg yolk emulsion was poured into the milk pan again, was boiled till the milk egg yolk emulsion bubbled, the milk egg yolk emulsion was stirred while being boiled, the fire was turned off and the milk egg yolk emulsion was let cooled for later use;
5. Bases of 100 g of fresh strawberries were removed, the fresh strawberries were cleaned thoroughly and cut into pieces, a small amount of water was added, and the fresh strawberries were smashed into smashed strawberries with a juicer;
6. Unsalted butter was chipped till it had a sharp corner, the smashed strawberries were poured into the unsalted butter, the mixture was uniformly stirred, and the mixture was then put in the cooled milk egg yolk emulsion in times, and the mixture was uniformly stirred; and
7. The mixture was poured into a clean container and frozen in a refrigerator for about 6 h to obtain a sugar-reducing ice cream product.

The sugar-reducing ice cream product obtained in the example is not different from common white granulated sugar ice cream product in terms of appearance, color and luster, fragrance, taste and so forth.

Application Example 3

Application of the white granulated sugar flavored sugar-reduced sweetener in soybean milk:
1. 50 g of soybeans and 30 g of millets were rinsed thoroughly with water, and water was controlled;
2. A proper amount of clean water was added into the cleaned soybeans and millets, and they were together poured into a soybean milk machine;
3. A "soybean milk" function button of the soybean milk machine was clicked to prepare soybean milk; and
4. Before drinking, a proper amount of the white granulated sugar flavored sugar-reduced sweetener product in the example 2 was added into the soybean milk to obtain the sugar-reducing soybean and millet soybean milk product.

The sugar-reducing soybean and millet soybean milk product obtained in the example is not different from common white granulated sugar soybean and millet soybean milk product in terms of appearance, color and luster, fragrance, taste and so forth.

Application Example 4

Characteristics of the white granulated sugar flavored sugar-reduced sweeteners obtained in the examples 1-5 and 8-13 were evaluated.

The characteristics were evaluated by a blind test of a 21-person group.

A method for testing sweetness times: 2 g of sucrose was weighed, 100 mL of water was added, and a 2% sucrose solution was prepared; (2/n) g of the white granulated sugar flavored sugar-reduced sweetener was additionally taken; 100 mL of water was added to dissolve the white granulated sugar flavored sugar-reduced sweetener; the two solutions were tasted comparatively; when the white granulated sugar flavored sugar-reduced sweetener was equivalent to the 2% sucrose solution in sweetness, the value n was the times of sweetness of the white granulated sugar flavored sugar-reduced sweetener relative to that of the sucrose; a method for testing taste and odor (sweetness and taste): by taking the 2% sucrose solution as a control group, white granulated sugar flavored sugar-reduced sweetener product solutions obtained in the examples equivalent to the 2% sucrose solution in sweetness were prepared and tasted manually to evaluate their tastes and odors. The tastes and odors are rated respectively according to scores 1-5, where score 1 represents the lowest evaluation on taste/odor, the tastes and odors are far from those of sucrose; score 5 represents the highest evaluation on taste/odor. Scores of tastes and odors of the examples are averaged and are added to obtain a subjective evaluation score, where the higher subjective evaluation score indicates better taste and odor, which are quite close to those of sucrose.

Dissolving speed, uniformity and stability are tested through a constant temperature water dissolving and standing experiment, with the result shown in table 1.

TABLE 1

Characteristic evaluation result of the white granulated sugar flavored sugar-reduced sweeteners obtained in the examples

| Numbers | Sweetness times | Subjective evaluation scores (taste + odor) | Dissolving speed, uniformity and stability |
|---|---|---|---|
| Example 1 | 1 time | 9.7 | The dissolving speed is high, there are no undissolved substances, the solution is not separated out after the sweetener left stand for 10 h, and the solution is colorless and transparent and free of color change. |
| Example 2 | 1 time | 9.5 | The dissolving speed is high, there are no undissolved substances, the solution is not separated out after the sweetener left stand for 10 h, and the solution is colorless and transparent and free of color change. |
| Example 3 | 1 time | 9.4 | The dissolving speed is high, there are no undissolved substances, the solution is not separated out after the sweetener left stand for 10 h, and the solution is colorless and transparent and free of color change. |
| Example 4 | 1 time | 9.3 | The dissolving speed is high, there are no undissolved substances, the solution is not separated out after the sweetener left stand for 10 h, and the solution is colorless and transparent and free of color change. |
| Example 5 | 1 time | 9.3 | The dissolving speed is high, there are no undissolved substances, the solution is not separated out after the sweetener left stand for 10 h, and the solution is colorless and transparent and free of color change. |
| Example 8 | 1 time | 8.7 | The dissolving speed is high, there are no undissolved substances, the solution is not separated out after the sweetener left stand for 10 h, and the solution is colorless and transparent and free of color change. |
| Example 9 | 1 time | 8.6 | The dissolving speed is high, there are no undissolved substances, the solution is not separated out after the sweetener left stand for 10 h, and the solution is colorless and transparent and free of color change. |
| Example 10 | 1 time | 8.8 | The dissolving speed is high, there are no undissolved substances, the solution is not separated out after the sweetener left stand for 10 h, and the solution is colorless and transparent and free of color change. |
| Example 11 | 1 time | 9.4 | The dissolving speed is high, there are no undissolved substances, the solution is not separated out after the sweetener left stand for 10 h, and the solution is colorless and transparent and free of color change. |
| Example 12 | 1 time | 9.1 | The dissolving speed is low, there are a small amount of undissolved substances, the solution is less separated out after the sweetener left stand for 10 h, and the color of the solution becomes light yellow. |
| Example 13 | 1 time | 8.2 | The dissolving speed is high, there are no undissolved substances, the solution is not separated out after the sweetener left stand for 10 h, and the solution is colorless and transparent and free of color change. |
| Example 14 | 1 time | 8.3 | The dissolving speed is high, there are no undissolved substances, the solution is not separated out after the sweetener left stand for 10 h, and the solution is colorless and transparent and free of color change. |
| Example 15 | 1 time | 9.2 | The dissolving speed is low, there are a small amount of suspended solids and precipitates, the solution is less separated out after the sweetener |

TABLE 1-continued

Characteristic evaluation result of the white granulated sugar flavored sugar-reduced sweeteners obtained in the examples

| | | Characteristics | |
|---|---|---|---|
| Numbers | Sweetness times | Subjective evaluation scores (taste + odor) | Dissolving speed, uniformity and stability |
| Example 16 | 1 time | 8.9 | left stand for 10 h, and the color of the solution becomes light yellow. The dissolving speed is low, there are a small amount of suspended solids and precipitates, the solution is less separated out after the sweetener left stand for 10 h, and the color of the solution becomes light yellow. |

It can be known from table 1 that the white granulated sugar flavored sugar-reduced sweeteners obtained in the examples of the present invention are quite similar to sucrose in terms of sweetness times, sweetness, taste, dissolving speed, uniformity and stability. Particularly, the high-intensity sweetener is compounded by mogroside V and other 11-O-mogroside, mogroside VI and siamenoside I at a certain mass ratio, and in the subjective evaluation by human tongues, the high-intensity sweetener is the closest to sucrose in terms of taste and odor. The sugar-reduced sweeteners obtained in the present invention are quite similar to sucrose in terms of taste and odor, and are free of undesirable flavors such as lingering bitterness, metallic taste and acrid odor, fresh and cool in taste and particularly pure in taste.

Application Example 5

The sweeteners are evaluated by a TS-5000Z intelligent gustatory analysis system, i.e., an electronic tongue. Basic gustatory sensory indexes such as bitterness, acrid odor, acidity, saline taste, delicate flavor, sweetness and original flavors of raw materials of samples such as food or medicines can be evaluated objectively and digitally by adopting an artificial lipid membrane sensor technique similar to gustatory cells of human tongue in working principle. Meanwhile, aftertastes of bitterness, acerbity and freshness (richness) and so forth can be further analyzed. Sucrose, sugar-free compounded sweetener (sweetener compounded by erythritol, stevioside and mogroside) and the white granulated sugar flavored sugar-reduced sweetener obtained in the example 1 are prepared into an aqueous solution with 1 time sweetness, and data is evaluated and tested with the electronic tongue for drawing, as shown in the FIGURE.

It can be known from the FIGURE that based on the sucrose aqueous solution with 1 time sweetness, acrid odor, lingering bitterness and sweetness after taste of the sugar-free compounded sweetener product are relatively obvious. The white granulated sugar flavored sugar-reduced sweetener product obtained in the example 1 is free of acrid odor, lingering bitterness and sweetness after taste, which is consistent with sucrose. In addition, the white granulated sugar flavored sugar-reduced sweetener product obtained in the example 1 is different from the sugar-free compounded sweetener in terms of tenderness, freshness and sweetness, but is quite similar to sucrose. Therefore, the sensory indexes of the white granulated sugar flavored sugar-reduced sweetener product obtained in the example 1 are substantially consistent with those of sucrose.

Application Example 6

The white granulated sugar flavored sugar-reduced sweetener products obtained in the example 1 and the comparative example 1 are experimentally compared below by way of visual inspection and instrument detection: by way of visual inspection, appearances and room temperature water dissolutions of the two are detected, where the appearances are evaluated according to the following grades: grade A: the sweetener is consistent in particle size, is spherical and is good in flowability; grade B: there is a deviation visible to the naked eye on particle size, and the sweetener is spherical and ellipsoidal, and is common in flowability; and grade C: there is an obvious difference visible to the naked eye on particle size, and the sweetener has various irregular shapes and is poor in flowability.

The moisture contents of the two are detected by means of loss on drying; 5 parts of sample are taken from the two randomly, 100 g per part of sample, and the content of mogroside V therein is detected by an HPLC external standard method, so as to verify whether the sample in the granulation process is uniformly mixed. Results are shown in Table 2.

TABLE 2

| Sources of the white granulated sugar flavored sugar-reduced sweetener products | Appearance (visual inspection) | Room temperature water dissolution experiment (visual inspection) | Moisture content (Loss on drying) | Contents of mogroside V in randomly extracted 5 parts of samples (HPLC external standard method) |
|---|---|---|---|---|
| Example 1 | A | The dissolving speed is high and there are no undissolved substances. | 3.25% | 0.043%; 0.043%; 0.044%; 0.043%; 0.042% |

TABLE 2-continued

| Sources of the white granulated sugar flavored sugar-reduced sweetener products | Appearance (visual inspection) | Room temperature water dissolution experiment (visual inspection) | Moisture content (Loss on drying) | Contents of mogroside V in randomly extracted 5 parts of samples (HPLC external standard method) |
|---|---|---|---|---|
| Example 3 | A | The dissolving speed is high and there are no undissolved substances. | 3.41% | 0.065%; 0.063%; 0.064%; 0.064%; 0.063% |
| Example 5 | A | The dissolving speed is high and there are no undissolved substances. | 3.36% | 0.079%; 0.079%; 0.080%; 0.079%; 0.080% |
| Example 11 | A | The dissolving speed is high and there are no undissolved substances. | 3.25% | 0.043%; 0.040%; 0.044%; 0.041%; 0.042% |
| Example 12 | B | The dissolving speed is low and there are microscale undissolved substances. | 3.64% | 0.041%; 0.044%; 0.042%; 0.038%; 0.039% |
| Example 15 | B | The dissolving speed is low and there are microscale undissolved substances. | 4.11% | 0.038%; 0.037%; 0.036%; 0.040%; 0.041% |
| Example 16 | C | The dissolving speed is low and there are microscale undissolved substances. | 6.59% | 0.042%; 0.032%; 0.041%; 0.035%; 0.026% |

Thus it can be seen that with the same spraying times of adhesive, the example 16 does not adopt the intermediate spraying mode but adopts one-time spraying. The obtained white granulated sugar flavored sugar-reduced sweetener product has the defects of non-uniform particle size, poor flowability, low dissolving speed and high moisture content with microscale undissolved substances, and also has the defect that the components of the high-intensity sweetener are not uniformly adhered. On the contrary, by way of degressively spraying the adhesive and increasing the mixing time each time progressively after injection, the white granulated sugar flavored sugar-reduced sweetener products obtained in other examples have the advantages of uniform particle sizes, good flowability, high dissolving speed, free of undissolved substances and low moisture content, and also have the advantage that the components of the high-intensity sweetener are uniformly adhered.

Application Example 7

The damping rate was also evaluated, specifically including: the sweeteners with certain mass (m0) in the examples and comparative examples were accurately weighed on a glass watch, the glass watch was placed in a 65RH % incubator at 25° C., and the glass watch was taken out in 12 h to test the mass (m1). The damping rate is calculated according to the following equation: damping rate (%)=m1−m0/m0×100%, as shown in table 3 below:

TABLE 3

| | Example 1 | Example 3 | Example 5 | Example 11 |
|---|---|---|---|---|
| Damping rate | 1.42% | 1.47% | 1.53% | 2.31% |
| | Example 12 | Example 15 | Example 16 | |
| Damping rate | 3.74% | 4.53% | 6.46% | |

Preferred implementation modes of the present invention are described in detail above and the present invention is not limited thereto. In the technical concept range of the present invention, the technical solutions of the present invention can be subjected to various simple transformations, including combination of technical features in any suitable way. These simple transformations and combination shall also be regarded as the contents disclosed by the present invention, which fall into the protection scope of the present invention.

The invention claimed is:

1. A sugar-reduced sweetener, comprising a high-intensity sweetener, a bulk sweetener and a sugar sweetener, wherein the dosages of the high-intensity sweetener and the bulk sweetener satisfy a condition that a combined sweetness of the high-intensity sweetener and the bulk sweetener accounts for 30% or less of a sweetness of the sugar sweetener,
   wherein the high-intensity sweetener comprises mogroside V, 11-O-mogroside V, mogroside VI, and siamenside I at the mass ratio of (50-60):(5-10):(3-7):(0.4-1);
   the bulk sweetener is erythritol, the sugar sweetener is white granulated sugar, and
the sugar sweetener accounts for 10-50% by weight in the sugar-reduced sweetener,
wherein the sugar-reduced sweetener is prepared by a preparation method comprising the steps of:
S1: dissolving the high-intensity sweetener and the sugar sweetener in hot water to form a mixture, filtering the mixture with a ceramic membrane to obtain an adhesive;
S2: heating and mixing the bulk sweetener into a fluidized bed of a boiling granulator;
S3: spraying the bulk sweetener with the adhesive 3-5 times during the heating and mixing, wherein the amount of a subsequent spray decreases less than 25 wt % of the amount of an immediately preceding spraying; a first mixing time is not less than 30-60 minutes and a time for each subsequent mixing is increased by 10-30 minutes; and
S4: drying and cooling the mixture to obtain the sugar-reduced sweetener.

2. The sugar-reduced sweetener according to claim 1, wherein the weight ratio of the high-intensity sweetener to the bulk sweetener is 1:(100-2000).

3. The sugar-reduced sweetener according to claim 2, wherein the weight ratio of the high-intensity sweetener to the bulk sweetener is 1:(400-800).

* * * * *